Jan. 16, 1945. R. M. OLIVER 2,367,604
FLUID PRESSURE BRAKE
Filed March 23, 1943 2 Sheets-Sheet 2
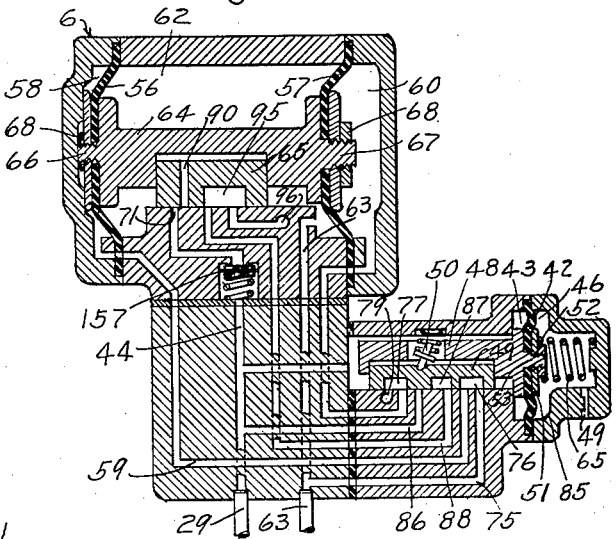
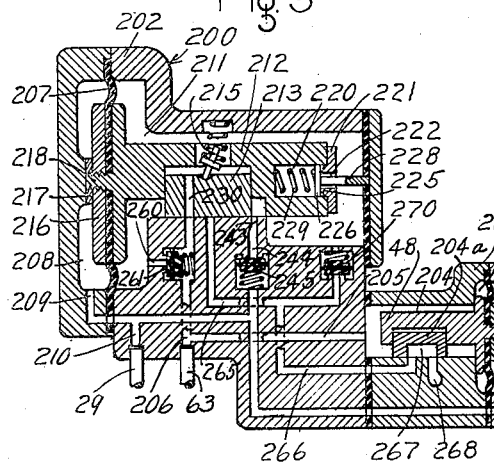
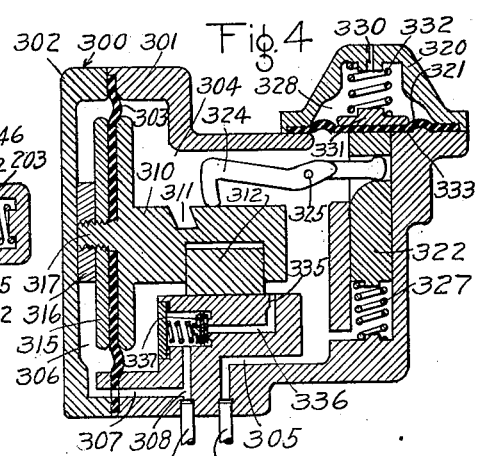
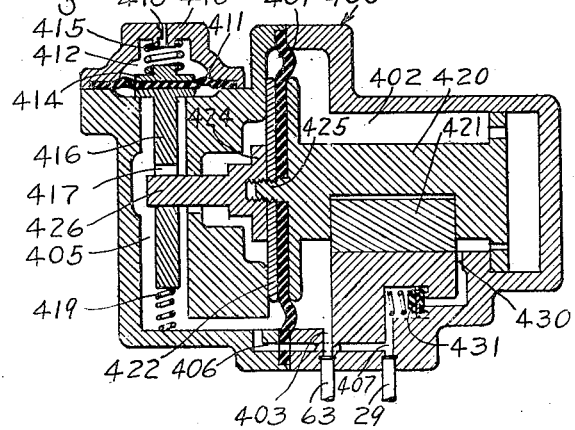
INVENTOR
ROBERT M. OLIVER
BY
ATTORNEY Patented Jan. 16, 1945

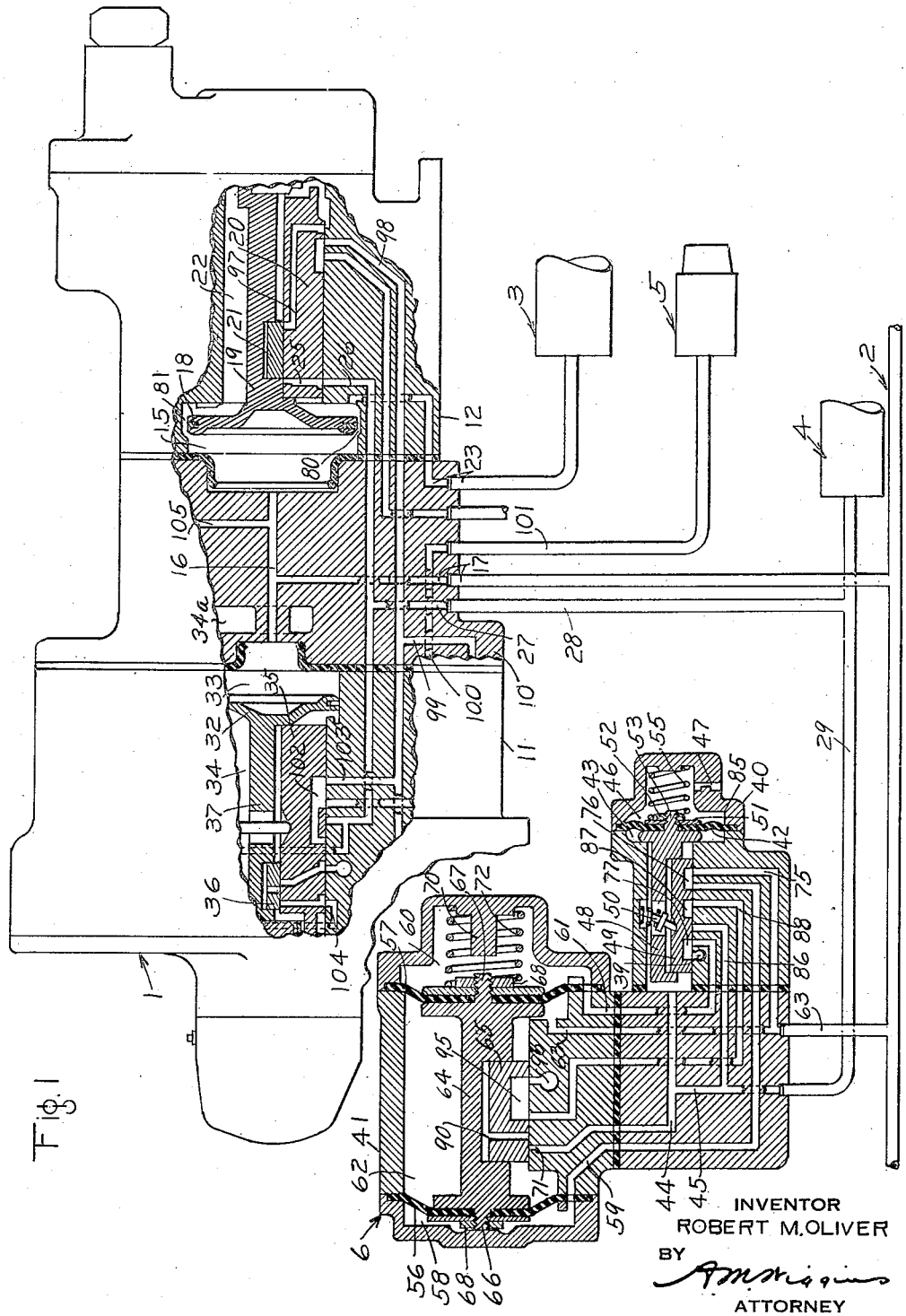

2,367,604

UNITED STATES PATENT OFFICE 2,367,604

FLUID PRESSURE BRAKE

Robert M. Oliver, Reno, Nev., assignor to The Westinghouse Air Brake Company, Wilmerding, Pa., a corporation of Pennsylvania Application March 23, 1943, Serial No. 480,142

34 Claims. (Cl. 303—64)

This invention relates to fluid pressure brakes for controlling the application and release of the brakes and more particularly to a brake equipment of the "AB" type such as is disclosed in Patent No. 2,031,213 issued to Clyde C. Farmer on February 18, 1936.

The railroad companies have provided several very important classes of train service, such for instance as passenger, express, and freight, and have designated and equipped certain cars for the particular service in which they are to be employed. It is well known that passenger trains are comparatively short and are operated on high speed schedules, that express trains are longer than passenger trains and are operated on speed schedules approaching passenger train schedules, and that freight trains are generally much longer than express trains and, with the exception of fast freight service, operate on slower speed schedules.

Modern transportation requirements are such that cars equipped for one class of service may also be employed in the other classes of service, so that, under normal train operating conditions, it is not uncommon for a train in express service to be made up wholly of freight cars.

While the "AB" type brake equipment is generally suitable for express or fast freight train service it has been found that certain operating characteristics thereof can be improved to better adapt it for such service. One desirable feature in either express or fast freight service is an increase in the charging rate, for the purpose of reducing the time required to initially charge the auxiliary and emergency reservoirs of the equipment.

On long trains it is desirable to restrict the rate of charge of the auxiliary and emergency reservoirs so as to make more air available for charging the equipment on the cars at the rear end of the trains, but on short trains where the charging of the brake pipe throughout the length of the train presents no difficulty the reservoirs may be charged at a more rapid rate. In view of this, my invention contemplates the charging of the auxiliary reservoir by way of the usual feed groove around the piston of the service portion of the "AB" brake controlling valve device and also the charging of the emergency reservoir through a separate communication at a rate substantially equal to that at which the auxiliary reservoir is charged.

The principal object of the invention is to accelerate the charging rate of the auxiliary and emergency reservoir of "AB" type freight brake equipment in short train service and the charging rate of an uncharged car when placed in a charged train.

According to the invention this object is accomplished by means of a charging valve device which is employed in conjunction with the usual "AB" brake controlling valve device and which is operative under certain conditions to increase the rate of charge of the auxiliary and emergency reservoirs.

Another object of the invention is to provide a charging valve device, for use in conjunction with the "AB" type brake controlling valve device, which is operative in initially charging the equipment to open a restricted passage through which fluid under pressure from the brake pipe may flow to the emergency reservoir to charge the emergency reservoir at a rate substantially the same as the rate of charge of the auxiliary reservoir by way of the feed groove around the piston of the service portion of the brake controlling valve device and which is automatically operative at all other times to close said passage.

According to this object the charging valve device is operative in initially charging the equipment to open a restricted passage through which fluid under pressure from the brake pipe may flow to the emergency reservoir so that the emergency reservoir will be charged at substantially the same rate as the auxiliary reservoir. With both reservoirs charged at substantially the same rate there will be no material flow of fluid between reservoirs and as a result both reservoirs will be charged more quickly than if the feed groove controlled the flow of fluid to both reservoirs.

A still further object is to provide a fluid pressure operated charging valve device of the above mentioned type with means whereby the device may be automatically locked in its non-charging position.

Other objects and advantages will appear in the following more detailed description of the invention.

In the accompanying drawings:

Fig. 1 is a diagrammatic view, mainly in section of a fluid pressure brake equipment embodying my invention and showing the brake controlling valve device in its normal release position and the charging valve device in its cut off position.

Figs. 2, 3, 4 and 5 are diagrammatic views each illustrating a different modification of the charging valve device employed for controlling the flow of fluid from the brake pipe to the emergency reservoir of the equipment shown in Fig. 1.

*Description of the equipment shown in Figure 1*

As shown in Fig. 1 of the accompanying drawings the apparatus may comprise a brake controlling valve device 1, a brake pipe 2, an auxiliary reservoir 3, an emergency reservoir 4, a brake cylinder device 5 and a charging valve device 6.

The brake controlling valve device 1 comprises a pipe bracket 10, an emergency portion 11 mounted on one face of said pipe bracket which is adapted to be controlled according to variations in the pressure of fluid in the brake pipe 2, and also comprises a service application valve portion 12 mounted on the opposite face of said pipe bracket which is also adapted to be controlled according to variations in the pressure of fluid in the brake pipe 2. This brake controlling valve device may be similar to that disclosed in the Clyde C. Farmer Patent No. 2,031,213, issued February 18, 1936, and since this device is well known by those skilled in the fluid pressure brake art the description thereof will be limited to only those parts which are required to bring out clearly the present invention.

The service application valve portion 12 comprises a casing having a piston chamber 15 which is connected to the brake pipe 2 by way of a passage 16 in the pipe bracket 10 and a passage and pipe 17. Contained in the piston chamber 15 is a piston 18 having a stem 19 adapted to actuate a main slide valve 20 and an auxiliary slide valve 21 contained in a valve chamber 22 which is connected to the auxiliary reservoir 3 by way of a passage and pipe 23.

As shown in Fig. 1 of the drawings, both the main slide valve 20 and the auxiliary slide valve 21 are in their normal release position. With these slide valves thus positioned the auxiliary slide valve 21 uncovers a restricted port 25 in the main slide valve 20 which is in registration with a passage 26 leading from the seat for the main slide valve, to the pipe bracket and emergency valve portion 11. This passage 26 is connected by way of a passage 27 in the pipe bracket to a pipe 28 which is in open communication with a pipe 29 leading to the emergency reservoir 4 and to the charging valve device 6.

The emergency portion 11 comprises a casing having a bore therein in which is mounted a piston 32 having at one side thereof a chamber 33 which is constantly connected, by way of the passage 16 and connected passage and pipe 17, with the brake pipe 2. The piston 32 has at the other side thereof a valve chamber 34 which is connected in the usual well known manner with a quick action chamber 34a formed in the pipe bracket 10.

The valve chamber 34 has mounted therein a main slide valve 35 and an auxiliary slide valve 36 having movement relative to the main slide valve. These slide valves are operated by means of a stem 37 preferably formed integral with the piston 32. The other parts of the mechanism of the emergency portion of the control valve device may be identical with those shown in the aforementioned patent, and since these other parts have no particular bearing on the present invention it is deemed unnecessary to show and describe such parts in detail.

The charging valve device 6 shown in Fig. 1 comprises a two part casing containing a reset portion 40 and a cut-off valve portion 41. The reset portion 40 comprises a casing containing a movable abutment in the form of a flexible diaphragm 42 having at one side a chamber 43 which is connected to the pipe 29 by way of a branch passage 44 and a connecting passage 45. At the opposite side of the diaphragm there is a chamber 46 which is constantly connected to a passage 47 leading to the atmosphere.

Contained in chamber 43 is a stem 48 which is operative to control a slide valve 49 also contained in the chamber 43, said slide valve being urged against a seat for the slide valve by a spring loaded plunger 50. The flexible diaphragm 42 which controls movement of the stem and thereby the slide valve 49 is clamped between the stem 48 and a diaphragm follower 51 contained in chamber 46 at the opposite side of the diaphragm, by means of a nut 52 having screw-threaded connection with a stud portion 53 provided at one end of the stem, which stud portion passes through a suitable control opening in the diaphragm.

Contained in chamber 46 and interposed between the diaphragm and operatively engaging the diaphragm follower 51 and the inner wall of the casing is a spring 55, which spring, at all times, tends to urge the diaphragm 42, stem 48 and slide valve 49 to the position in which they are shown in the drawings.

The cut-off valve portion comprises a casing in which there is mounted a pair of spaced flexible diaphragms 56 and 57 of substantially the same area. At one side of the flexible diaphragm 56 there is a chamber 58 which is in constant open communication with a passage 59 leading to the seat for the slide valve 49 in the reset portion 40. At one side of diaphragm 57 there is a chamber 60 which is in constant open communication with a passage 61 also leading to the seat for the slide valve 49 in the reset portion 40.

Intermediate the diaphragms 56 and 57 there is a chamber 62 which is in constant open communication with the brake pipe 2 by way of a passage and pipe 63. These diaphragms are operatively connected together, in a manner presently described by a stem 64 which is provided for controlling a slide valve 65 contained in chamber 62.

The stem 64 is provided at opposite ends with a stud portion 66 and 67 which extend through the diaphragms 56 and 57, respectively. A diaphragm follower plate is applied over each stud and is secured in position in engagement with the respective diaphragm by means of a nut 68 having screw-threaded engagement with the respective stud.

Contained in chamber 60 is a stop member 70 which projects from the inner wall of the casing and from which the end of the stud portion 67 is normally spaced. Also contained in chamber 60 and surrounding the stop member 70 and operatively engaging the diaphragm follower plate and the inner wall of the casing is a spring 72, which spring, at all times, tends to urge the diaphragm assemblage including diaphragms 56 and 57, stem 64 and slide valve 65 in a direction toward the left-hand as viewed in the accompanying drawings.

Assuming the brakes on the vehicle to be released and the brake system embodying the invention to be deplete of fluid under pressure, the brake controlling valve device 1 will be in release position as shown, and the several parts of the charging valve device 6 will all be in the position in which they are illustrated in Fig. 1 of the drawings.

In initially charging the brake system under the above conditions fluid under pressure is supplied to the brake pipe 2 in the usual well known manner. From the brake pipe, fluid under pressure flows through pipe and passage 63 to chamber 62 intermediate the diaphragms 56 and 57 in the cut-off valve portion of the charging valve device 6. Since the area of the diaphragms 56 and 57 are substantially the same, the spring 72 will act to hold the diaphragm assemblage in the position in which it is shown in Fig. 1.

Fluid under pressure supplied to passage 63 also flows to chamber 58 in the cut-off valve portion of the charging valve device 6 by way of a passage 75 a cavity 76 in the slide valve 49 of the reset portion of the charging valve device and passage 59, the cavity 76 being so arranged that when the slide valve 49 is in the position in which it is shown in Fig. 1, it connects passage 75 to passage 59. With the slide valve in this position the chamber 60 is connected to the atmosphere by way of passage 61, cavity 77 in slide valve 49 and passage 39. When the pressure of fluid thus supplied to chamber 58 and acting on the outer face of diaphragm 56 has been increased to approximately five pounds, the diaphragm assemblage which includes diaphragms 56 and 57 and connected stem 64 and slide valve 65 will be caused to move in a direction toward the right-hand against the opposing pressure of spring 72 until brought to a stop by the end of the stud portion 67 engaging the stop member 70. When this occurs, the slide valve 65 will have been moved into a position in which it uncovers passage 44 in the seat, which passage is restricted at 71. With the slide valve thus positioned, fluid under pressure in chamber 62 flows therefrom through passage 44 from whence it flows to the emergency reservoir 4 by way of connected passage 45 and pipe 29.

Fluid under pressure supplied to passage 44 also flows to slide valve chamber 43 in the reset portion 40 of the charging valve device 6, the spring 55, maintaining the diaphragm 42 and attached slide valve 49 in the position in which they are shown until a predetermined pressure has been built up in the valve chamber, for a reason presently described.

From the foregoing description it will be understood that in initially charging the equipment the charging valve device 6 will operate in the manner described to open a restricted communication through which fluid under pressure supplied to the brake pipe 2 may flow to the emergency reservoir 4 for charging said reservoir. It will be understood that this communication for charging the emergency reservoir is in addition to the usual charging communication which will now be described.

Fluid under pressure supplied to the brake pipe 2 also flows through pipe and passage 17 and connected passage 16 to the piston chambers 33 and 15 of the emergency and service portions 11 and 12, respectively, of the brake controlling valve device 1.

With the emergency piston 32 in release position as shown, fluid under pressure flows from the piston chamber 33 to the quick action chamber 34a and connected valve chamber 34 in the usual manner (not shown). With the service piston 18 in release position as shown, fluid under pressure flows from the piston chamber 15 through the usual feed grooves 80 and 81 to the valve chamber 22. From this chamber fluid flows through passage and pipe 23 to the auxiliary reservoir 3. The flow area of the restricted portion 71 of the passage 44 is such that the rate of increase in the pressure of fluid in the emergency reservoir will substantially correspond to the rate of increase in the pressure of fluid in the auxiliary reservoir, so that there will be no flow of fluid from the chamber 22 and consequently from the auxiliary reservoir to the emergency reservoir. If for any reason the rate of increase in auxiliary reservoir should exceed that of the emergency reservoir then fluid will flow from chamber 22 to the emergency reservoir. Any such flow will be negligible and immaterial since the major portion of the emergency reservoir fluid is delivered by way of passage 44.

Now when the pressure of fluid in the emergency reservoir 4 and connected chamber 43 in the reset portion of the charging valve device have been increased to some predetermined degree, say to around 40 pounds, the diaphragm 42 will be caused to deflect in a direction toward the right-hand against the opposing pressure of spring 55. The diaphragm as it is thus deflected acts through the medium of the stem 48 to shift the slide valve 49 in the same direction. When the diaphragm is brought to a stop by the follower 51 engaging a portion 85 of the casing, the slide valve 49 will have been moved into a position preparatory for operation of the diaphragm assemblage of the cut-off valve portion of the charging valve device to its cut-off position.

With the slide valve 49 of the reset portion 40 positioned as just described, the cavity 77 therein will connect passage 61 to a passage 86 which latter passage is connected to emergency reservoir passage 45. With communication between passages 61 and 45 thus established, fluid at emergency reservoir pressure flows to chamber 60 in the cut-off valve portion 41 by way of pipe 29, passage 45, passage 86, cavity 77 in slide valve 49 and passage 61. The slide valve 49 in this position cuts off communication between passages 75 and 59. With the slide valve in this position, a cavity 87 therein connects passage 59 to a passage 88. With passages 59 and 88 thus connected, fluid under pressure at brake pipe pressure in chamber 62 flows to the chamber 58 by way of a port 90 in the slide valve 65 of the cut-off valve portion, passage 88 leading from the seat for said slide valve, cavity 87 in slide valve 49 of the reset portion 40 and passage 59, so that chamber 58 is maintained at brake pipe pressure.

As the pressure of fluid in the brake pipe 2 and the emergency reservoir 4 is increased the pressure of fluid in connected chambers 58 and 60 is also increased.

It will be understood that the increase in the pressure of fluid in chamber 58 is more rapid than the increase in chamber 60 since the emergency reservoir and consequently chamber 60 are charged at a restricted rate as governed by the restriction 71, thus the charging valve device 6 will remain in its charging position so long as the pressure of fluid in the brake pipe and connected chamber 58 exceeds the combined pressure of fluid in chamber 60 and spring 72. When the differential in pressure between the brake pipe 2, acting in chamber 58, and the emergency reservoir 4, acting in chamber 60, has been reduced to approximately five pounds, the spring 72 acting in conjunction with emergency reservoir pressure in chamber 60 will act to cause the diaphragm assemblage to move in a direction toward the left-hand into the position in which it is shown in the drawings.

With the diaphragm assemblage positioned as shown the slide valve 65 closes communication between chamber 62 and the passage 44 so that further flow of fluid from the brake pipe to the emergency reservoir through the charging valve device 6 is not permitted. It will also be noted that upon movement of the slide valve 65 to this position, the passage 90 therein is out of communication with passage 88, and a cavity 95 in the slide valve connects passage 88 to an atmospheric passage 96. With this latter connection established, fluid under pressure in chamber 58 is vented to the atmosphere by way of passage 59 cavity 87 in the slide valve 49 of the reset portion 40, passage 88, cavity 95 in the slide valve 65 of the cut-off portion 41 and atmospheric passage 96, thus insuring that the diaphragm assemblage will be maintained in its cut-off position so long as the pressure of fluid in the emergency reservoir 4 and connected chamber 43 in the reset portion 40 of the charging valve device does not fall below a predetermined pressure, such for example as 40 pounds.

With the cut-off valve thus positioned in its cut-off position, the final build up of pressure in the emergency reservoir 4 will take place through the brake controlling valve device 1 in the usual manner by way of the feed grooves 81, valve chamber 22, restricted passage 25 in the main slide valve 20 of the service portion, passage 26, passage 27 and connected pipes 28 and 29.

From the foregoing description it will be understood that the charging valve device 6 operates in initially charging the equipment to provide an additional or auxiliary charging communication through which fluid under pressure may flow from the brake pipe to the emergency reservoir until the emergency reservoir is charged to within a few pounds of the normal pressure carried therein. With fluid under pressure flowing from the brake pipe to the emergency reservoir through the additional charging communication, the fluid under pressure flowing through the feed grooves 81 will charge the chamber 22 and auxiliary reservoir at a much faster rate than is possible in brake equipments not having the additional emergency reservoir charging communication. This will be obvious when it is remembered that the emergency reservoir is increasing at a rate substantially equal to the rate at which auxiliary reservoir pressure is increasing and that as a consequence the emergency reservoir does not rob the auxiliary reservoir of the fluid flowing through the feed grooves 81. It will thus be seen that by the use of the additional charging communication the time required to initially charge the reservoirs will be materially reduced over that heretofore required.

Since as hereinbefore mentioned the charging valve device 6 is maintained in its cut-off position so long as emergency reservoir pressure is not reduced below some relatively low value, such for instance, as 40 pounds, it will be understood that the device will function only during initial charging of the equipment and when, for any reason, the emergency reservoir pressure has been reduced below about 40 pounds. With the charging valve device 6 maintained inoperative it cannot in any way effect the normal operating characteristics of the brake equipment, so that the equipment will function in the same manner as the equipment which is fully described and claimed in the aforementioned patent, except for charging the equipment when the emergency reservoir pressure is at some relatively low value. In view of the fact that the charging mechanism for the emergency reservoir only functions in charging the equipment when the emergency reservoir pressure is below forty pounds, it is deemed unnecessary to describe in detail either a service or a normal emergency application of the brakes and a subsequent release after either of such applications.

Description of the charging valve device shown in Fig. 2

In Fig. 2 of the accompanying drawings another form of the charging valve device 6 is shown which is the same as the charging valve device shown in Fig. 1 except that a check valve 157 is interposed in the passage 44 and spring 72 and stop 70 in chamber 60 of the cut-off valve portion are omitted, and a new simplified cover for the chamber 60 is substituted. Since, with the above exceptions, this charging valve device is of substantially the same construction as the charging valve device shown in Fig. 1, the following description of the details and operations of the device will omit as far as is possible the operating characteristics which are common to both devices.

From the foregoing description of the operation of the charging valve device shown in Fig. 1 it will be understood that with the modified charging valve device positioned as shown in Fig. 2, the chamber 58 will be connected to the brake pipe and the chamber 60 will be connected to the atmosphere. Since spring 72 is omitted any increase in pressure in chamber 58 sufficient to overcome the friction of the diaphragm assemblage, which includes the slide valve 65, will cause the assemblage to move in a direction toward the right until brought to a stop by the end of the stud 67 engaging the adjacent cover.

With the slide valve 65 in this position the additional charging passage 44 is uncovered and fluid under pressure at brake pipe pressure in chamber 62 flows therefrom through the restricted passage 44, past check valve 157 interposed in said passage to chamber 43 in the reset portion and to the emergency reservoir pipe 29 and consequently to the emergency reservoir.

When the pressure of fluid in the emergency reservoir and connected chamber 43 in the reset portion has been increased to about 40 pounds the reset portion will operate, as previously described in connection with Fig. 1, to supply fluid under pressure at emergency reservoir pressure to chamber 60 and at the same time maintain chamber 58 connected to the brake pipe. Since in this embodiment of the invention no spring is employed in conjunction with the diaphragm assemblage the assemblage will be maintained in its charging position so long as brake pipe pressure in chamber 58 is not reduced enough below emergency reservoir pressure in chamber 60 to permit the emergency reservoir pressure to overcome friction and move the diaphragm assemblage to its cut-off position. In initially charging the equipment the brake pipe pressure is being increased, therefore, the charging passage 44 leading from the brake pipe to the emergency reservoir is maintained open until this reservoir is fully charged to the pressure normally carried in the brake pipe.

In effecting either a service or an emergency application of the brakes, brake pipe pressure is reduced in the usual manner and as a result the pressure of fluid in chamber 62 and connected chamber 58 is reduced. At this time check valve 157 will prevent back flow of fluid under pressure from the emergency reservoir to chamber 62. Now when the pressure in chamber 58 has been reduced a slight degree, the higher emergency reservoir pressure acting in chamber 60 will cause the diaphragm assemblage to move into the position in which it is shown in Fig. 2 of the drawings.

Upon movement of the diaphragm assemblage into this position the cavity 95 slide valve 65 will establish communication between passage 88 and the atmosphere and since the reset slide valve 49 is in its outermost position the cavity 87 connects the passage 59 and thereby the chamber 58 to the passage 88 thus reducing the pressure of fluid in chamber 58 to atmospheric pressure. With the chamber 58 at atmospheric pressure it is obvious that the diaphragm assemblage will remain in the position just described until such time as the reset valve mechanism operates to its innermost position upon a reduction in emergency reservoir pressure to below forty pounds. It will thus be seen that diaphragm assemblage will be maintained in its last mentioned position during all normal service and emergency braking operations.

*Description of the charging valve device shown in Fig. 3*

In Fig. 3 of the accompanying drawings still another form of charging valve device is shown. This charging valve device is identified by the reference numeral 200 and comprises a reset portion 201 and a cut-off portion 202. The reset portion 201 is similar to the reset portions shown and described in Figs. 1 and 2 but differs therefrom in that the chamber 46 at one side of the diaphragm and containing a spring 203 is connected to the emergency reservoir in a manner hereinafter described instead of being connected to the atmosphere and differs further in that a new stem 204 and a slide valve 204a are provided in the valve chamber 43. In this embodiment of the invention chamber 43 is connected to the brake pipe by way of a passage 205, a connecting passage 206 and pipe 63.

The cut-off valve portion 202 comprises a casing in which there is mounted a flexible diaphragm 207. At one side of the diaphragm there is a chamber 208 which is in constant open communication with a passage 209 which is connected by a branch passage 210 to the pipe 29 and consequently to the emergency reservoir 4. At the opposite side of the diaphragm there is a chamber 211 containing a stem 212 which is operative to control a slide valve 213 also contained in chamber 211, said slide valve being urged against its seat by a spring pressed plunger 215. The flexible diaphragm 207, which is operative to control movement of the stem 212 and thereby the slide valve 213, is clamped between the stem 212 and a diaphragm follower 216 contained in chamber 208 by means of a nut 217 having screw-threaded connection with a stud portion 218 provided at one end of the stem and extending through a suitable central opening provided in the diaphragm.

The opposite end of the stem 212 is provided with an annular recess or bore 220 which is closed at its outer end by a cap member 221 having a central opening 222. The inner wall of the cap member is provided with an annular projection 225 which surrounds the openings 222 and extends into the recess or bore 220 and serves as a stop for a movable spring seat 226 slidably mounted in the recess.

Contained in chamber 211 and projecting from the inner wall of the casing is an integral stop member 228, which extends through the central opening 222 in the cap and at its end engages the spring seat 226.

Contained in the recess or bore 220 and interposed between and operatively engaging the inner wall of the bore and the spring seat 226 is a spring 229 which, at all times, tends to urge the diaphragm 207, stem 212 and slide valve 213 to the position in which they are shown in Fig. 3 of the drawings.

Assuming that the charging valve device 200, conditioned as shown in Fig. 3, is substituted for the charging valve device 6 of Fig. 1, with the controlling valve device 1 in release position as shown in this figure. Under these conditions, in initially charging the equipment, it will be understood from the previous description of the apparatus shown in Fig. 1, that the brake controlling valve device 1 will operate in the usual manner to supply fluid under pressure from the brake pipe to the chamber 43 and connected auxiliary reservoir, the flow of fluid to the chamber being by way of pipe 63, passage 206 and connected passage 205, the spring 203 temporarily maintaining the diaphragm 42 and thereby the stem 204 and slide valve 204a in the position in which they are shown.

With the slide valve 213 of the cut-off portion positioned as shown, fluid under pressure supplied to passage 206 also flows therefrom through a port 230 in the slide valve 213 to chamber 211, from whence it flows through a restricted passage 244 the restriction in said passage being indicated by the reference numeral 243. Fluid under pressure thus supplied to passage 244 flows past a spring weighted check valve 245, interposed in the passage, to the chamber 46 in the reset portion 201, and through connected passage 209 to chamber 208 in the cut-off valve portion and also to the emergency reservoir 4 by way of branch passage 210 and pipe 29.

As the pressure of fluid in the brake pipe increases the pressure of fluid in chamber 43 of the reset portion and in chamber 211 of the cut-off portion also increases and the pressure of fluid in this latter chamber acting in conjunction with spring 229 in opposition to the pressure of fluid in the emergency reservoir 4 and connected chamber 207 maintains the diaphragm and connected slide valve in the cut-off portion in the position shown.

In charging fluid pressure brake equipments fluid under pressure is supplied to the brake pipe at a faster rate than it can flow to the auxiliary and emergency reservoirs. As a result of this the brake pipe pressure will be temporarily increased over the pressure in the reservoirs until such time as the equipment is substantially fully charged.

If during the initial charging period the brake pipe pressure in chamber 43 of the reset portion exceeds the emergency reservoir pressure plus that of the spring 203 acting in chamber 46, the diaphragm will be deflected in a direction toward the right-hand causing the attached stem and slide valve 204 to move in the same direction until stopped by the follower 52 engaging the surface 85 of the casing.

With slide valve 204 in this position, a communication is established from the chamber 43 to chamber 211 of the cut-off portion which communication includes a passage 266, a passage 265 and check valve 270 interposed in passage 265. Since the chamber 211 is being charged by way of passage 206 and port 230 the pressure of fluid in the chamber will be substantially equal to that in chamber 43 so that there may be no flow from chamber 43 to chamber 211 by way of the communication just traced. It will be understood that as the emergency reservoir pressure in the chamber 46 and the brake pipe pressure in chamber 43 equalize the spring 203 will act to move the diaphragm assemblage including slide valve 204a back to the position in which it is shown in the drawings, thus closing the communication from the chamber 43 in the reset portion to chamber 211 in the cut-off portion.

From the foregoing it will be understood that the cut-off valve portion 202 of the charging valve device will operate to establish communication through which fluid under pressure may flow from the brake pipe to the emergency reservoir which communication will be maintained open so long as chamber 211 is in open communication with the brake pipe.

When, in effecting either a service or an emergency application of the brakes, brake pipe pressure is reduced in the usual manner the pressure of fluid in chamber 211 will be correspondingly reduced. The flow of fluid from chamber 211 to the brake pipe may take place through two circuits, the first of which is through port 230 in the slide valve 213, passage 206 and pipe 63. The other circuit is by way of a passage 260, past a spring weighted check valve 261 interposed in this passage and connected passage 206 and consequently the brake pipe 2. The check valve 245 at this time preventing the back flow of fluid under pressure from the emergency reservoir to chamber 211.

As the pressure of fluid in chamber 211 continues to fall with brake pipe pressure the fluid at emergency reservoir pressure in chamber 208 acts to flex the diaphragm 207 in a direction toward the right-hand and thus causes the stem 212 and attached slide valve 213 to move in the same direction to a lap position. In lap position the passage 230 in the slide valve is moved out of alignment with passage 206 in the seat thus cutting off further flow of fluid under pressure through the first circuit just traced, but the pressure of fluid in chamber 211 continues to reduce with brake pipe pressure through the second circuit traced, i. e., past check valve 261 to passage 206. As the pressure of fluid in chamber 211 continues to reduce, the emergency reservoir pressure in chamber 208 causes the diaphragm stem and slide valve to be moved further in a direction toward the right-hand until the passage 230 in the slide valve is aligned with a passage 265 in the seat. With passage 230 aligned with passage 265, fluid under pressure in chamber 211 is vented to the atmosphere by way of passage 230 in the slide valve, passage 265 in the seat, a passage 266, a cavity 267 in slide valve 204a of the reset portion and an atmospheric pressure 268. With chamber 211 thus vented to the atmosphere, the pressure of fluid at emergency reservoir pressure acting in chamber 208 maintains the cut-off portions of the valve in its cut-off position.

It is well known by those skilled in the fluid pressure brake art that during service applications there is no material drop in emergency reservoir pressure nor is there a decrease in emergency reservoir pressure below 40 pounds during a normal emergency application, the normal decrease in emergency reservoir pressure during an emergency application being from seventy pounds to approximately sixty pounds. Since brake pipe pressure in chamber 211 of the cut-off portion is reduced to atmospheric pressure during either a service or emergency application of the brakes, emergency reservoir pressure in chamber 208 maintains the cut-off portion in its cut-off position against the opposing pressure of spring 229, and since brake pipe pressure in chamber 43 of the reset portion is reduced with brake pipe pressure, the spring 203 and fluid at emergency reservoir pressure in chamber 46 maintains the slide valve 204 positioned as shown.

Now when it is desired to effect a release of the brakes following either a service or an emergency application it will be understood that the reset slide valve will be maintained in the position shown by the spring 203 and emergency reservoir pressure, thus maintaining chamber 211 of the cut-off portion connected to the atmosphere. Under these conditions the auxiliary charging port 243 will be maintained closed by the slide valve 213 and recharging of the auxiliary reservoir will take place in the usual manner through the brake pipe controlling valve device.

If, however, the pressure of fluid in the emergency reservoir and connected chamber 208 in the cut-off portion and chamber 46 of the reset portion should for any reason become reduced to below forty pounds, then when fluid under pressure is supplied to the brake pipe, the rapid increase in the pressure of fluid in chamber 43 of the reset portion will soon exceed the pressure of fluid plus that of spring 203 in the reset portion and cause the diaphragm 42 to flex in a direction toward the right-hand. Flexing of the diaphragm in this direction will cause the stem and attached slide valve to move in the same direction and uncover passage 266. With passage 266 thus uncovered, fluid under pressure flows from the brake pipe 2 to chamber 211 in the cut-off portion by way of pipe 63, passage 205, passage 206, chamber 43 in the reset portion passage 266 and passage 265 and port 230 in the slide valve 213. When the pressure in chamber 211 together with spring 229 is increased to a degree sufficient to overcome the opposing pressure of fluid in chamber 208 the diaphragm 207, stem 212 and slide valve 213 will move toward the position in which they are shown. As the slide valve thus moves, the port 230 therein will be moved out of alignment with passage 265 and then into alignment with passage 206 in the seat.

It should here be mentioned that due to this movement of the slide valve, the flow of fluid through the port 230 to the chamber 211 will be gradually cut off until such time as the port is entirely out of communication with passage 265. During this time the flow of fluid from the brake pipe to the chamber will be by way of passages 266 and 265 and check valve 270. This insures a continuous increase in pressure of fluid in the chamber and thereby the movement of the slide valve to the position in which the port 230 is in complete registration with the brake pipe passage 206. With port 230 in complete registration with passage 206 fluid at brake pipe pressure will flow directly to the chamber by way of pipe 63, and the passage and port. At the same time the slide valve 213 will uncover restricted passage 243 so that the brake pipe pressure will again flow by way of chamber 211 to the emergency reservoir.

Description of the charging valve device shown in Fig. 4

In Fig. 4 of the accompanying drawings a charging valve device 300 is shown which may be substituted for the charging valve shown in Fig. 1 and employs mechanical lock means for maintaining the valve in its cut-off position.

As shown, this charging valve device comprises a casing 301 and a cover portion 302 between which there is clamped a flexible diaphragm 303. At one side of diaphragm 303 there is a chamber 304 which is in constant open communication with the brake pipe by way of a passage 305 and connected pipe 63. At the opposite side of the diaphragm there is a chamber 306 which is in constant open communication with the emergency reservoir 4 by way of a passage 307, a connected passage 308 and pipe 29.

Contained in chamber 304 is a stem 310, having a notch 311, for a purpose hereinafter described. This stem is operative to control a slide valve 312 also contained in chamber 304. The flexible diaphragm 303 controls movement of the stem 310 and thereby the slide valve 312 and is clamped between the stem 310 and a diaphragm follower 315 contained in chamber 306 at the opposite side of the diaphragm, by means of a nut 316 having screw-threaded connection with a stud portion 317 provided at one end of the stem and which passes through a central opening in the diaphragm.

Clamped between the casing 301 and a cover portion 320 is a flexible diaphragm 321 which is exposed on one side to the chamber 304. Contained in chamber 304 and engaging the lower face of the diaphragm 321 is a stem 322 which is slidably guided in the casing. This stem is operatively connected to one end of latch member 324 which is pivotally mounted intermediate its ends on a pin 325 carried by the casing. Also contained in this chamber and interposed between and operatively engaging the lower end of the stem 322 and the wall of the casing is a spring 327 which, at all times, tends to urge the stem 322 upwardly into engagement with the diaphragm as shown in the drawings.

At the opposite side of the diaphragm 321 there is a chamber 328 which is in constant open communication with the atmosphere by way of a passage 330. Contained in chamber 328 and operatively engaging the inner wall of the chamber and a diaphragm follower 331 is a spring 322 which, at all times, tends to urge the diaphragm to the position in which it is shown in the drawings, in which position the diaphragm is stopped by engagement with a portion 333 of the casing.

In initially charging the equipment with this charging valve device 300 substituted for the charging valve device 6 shown in Fig. 1, fluid under pressure supplied to pipe 63 flows therefrom to chamber 304 by way of passage 305.

With the slide valve 312 in the position shown, fluid under pressure supplied to chamber 304 flows therefrom through a passage 336, a restriction 335 in passage 336, past a spring weighted check valve 337, interposed in passage 336, to passage 308. From passage 308 fluid under pressure flows to the emergency reservoir by way of pipe 29 and also to chamber 306 by way of passage 307.

When the pressure of fluid in chamber 304 has been increased to a degree sufficient to overcome the opposing pressure of spring 332, say for example to forty pounds, the diaphragm 321 is caused to deflect in an upwardly direction from the position in which it is shown in the drawings. Since the spring 327 is exerting an upwardly directed force on stem 322, the stem is caused to move in the same direction. As the stem 322 moves in this direction, the latch 324 is caused to rock in a counter-clockwise direction about the pin 325 until the free end thereof contacts the upper surface of the stem 310.

Since, as hereinbefore described in connection with the other embodiments of the charging valve device, the brake pipe pressure increases at a more rapid rate than emergency reservoir pressure, the diaphragm 303 and attached stem 310 and slide valve 312 will be maintained in the position shown. With the slide valve thus positioned it will be be understood that the auxiliary charging passage through the charging valve device is maintained open so long as brake pipe pressure in chamber 304 overcomes the opposing emergency reservoir pressure in chamber 306.

Now when either a service or an emergency application of the brakes is effected, the brake pipe pressure and consequently the pressure in chamber 304 of the charging valve device will be reduced. The check valve 337 at this time prevents back flow of fluid from the emergency reservoir and connected chamber 306 to the brake pipe.

When the pressure of fluid in chamber 304 has been reduced to a degree sufficient to permit emergency reservoir pressure acting in chamber 306 to overcome the friction of the diaphragm assemblage, the diaphragm will be caused to flex in a direction toward the right-hand as viewed in the drawings. Deflection of diaphragm 303 in this direction causes the attached stem 310 and slide valve 312 to move in the same direction, thereby cutting-off communication between chamber 304 and passage 336. With this communication cut-off further flow of fluid from the brake pipe to the emergency reservoir through the restricted auxiliary charging passage 335 is cut-off.

The stem 310 continues to move in a direction toward the right-hand until the free end of the latch member 324 drops into the notch 311. When this occurs the cut-off valve slide valve 312 is locked in its cut-off position, in which position it will be maintained until such time as the pressure of fluid in the brake pipe and connected chamber 304 is reduced to approximately forty pounds as will hereinafter appear.

Upon a reduction in the pressure of fluid in chamber 304 to approximately forty pounds the spring 332 will cause the diaphragms 321 to deflect downwardly into the position in which it is shown in the drawings. As the diaphragm deflects to this position it will cause the stem 322 to move downwardly against the pressure of spring 327. Movement of the stem in this direction will cause the latch member 324 to rock about the pivot pin 325 in a clockwise direction, thereby moving the free end of the latch member out of locking engagement with notch in the stem.

Since, however, the diaphragm 303 is subject on one side to brake pipe pressure and on the other side to emergency reservoir pressure and since emergency reservoir pressure never drops below brake pipe pressure during either normal service or emergency operation, as already described, it will be understood that this charging valve device functions only during initial charging of the equipment to open the charging communication for the emergency reservoir.

Description of the charging valve device shown in Fig. 5

In Fig. 5 of the accompanying drawings another form of charging valve device is shown which device employs a mechanical locking means for maintaining the charging valve in its cut-off position, at all times, except when initially charging the equipment.

As shown in Fig. 5 this charging valve device which is indicated by the reference numeral 400 comprises a casing containing a flexible diaphragm 401 having at one side a chamber 402 which is in constant open communication with the brake pipe by way of a passage 403 and connected pipe 63.

At the other side of the diaphragm 401 is a chamber 405 which is in constant open communication with the emergency reservoir 4 by way of a passage 406, a passage 407 and connected pipe 29.

Clamped between the casing and a cap portion 410 is a diaphragm 411 having at one side a chamber 412 which is in constant open communication with the atmosphere by way of a passage 413. Contained in this chamber and interposed between and operatively engaging the inner wall of the cap and a diaphragm follower 414 is a spring 415 which, at all times, tends to urge the diaphragm into the position in which it is shown in the drawings.

The diaphragm 411 is exposed at the other side to chamber 405. Contained in this chamber and abutting the under or lower side of the diaphragm is a stem 416 having provided therein, intermediate its ends an opening 417. Interposed between the outer end of the stem and the inner wall of chamber 405 is a spring 419 which tends, at all times, to urge the stem 416 into engagement with the diaphragm 411.

Contained in chamber 402 is a stem 420 which is operative to control a slide valve 421 also contained in chamber 402. The diaphragm 401 which controls the movement of the stem 420 and thereby the slide valve 421 is clamped between the stem 420 and a diaphragm follower 422 contained in chamber 405 at the opposite side of the diaphragm, by means of a nut 424 having screw-threaded connection with a stud portion 425 provided at one end of the stem, which stud portion passes through a central opening in the diaphragm.

The nut 424 is provided with an extension 426 which is slidably guided in the casing and which is so constructed and arranged to extend through the opening 417 in the stem 416 when the operating parts of the charging valve device are in the position in which they are shown in the drawings.

In initially charging the equipment shown in Fig. 1 with the charging valve device 400 substituted for the charging valve device 6, fluid under pressure supplied to pipe 63 flows therefrom to chamber 402 by way of passage 403.

With the slide valve 421 positioned as shown, fluid under pressure supplied to chamber 402 flows therefrom through a restricted passage 430, past a spring weighted check valve 431 interposed in passage 430 to passage 407. From passage 407 fluid under pressure flows to the pipe 29 and consequently to the emergency reservoir 4 and also to chamber 405 by way of connected passage 406.

It will be understood that when this charging valve device is employed the brake controlling valve device 4 will operate in the usual manner to establish communication between the brake pipe and the auxiliary and emergency reservoirs, as hereinbefore described in connection with Fig. 1 and that the restricted passage 430 in the charging valve device, passage 407 and pipe 29 constitutes charging communication for the emergency reservoir.

Since the increase in brake pipe pressure is at a faster rate than the increase in emergency reservoir pressure, the charging valve device will be maintained positioned as shown in Fig. 5 until and while the equipment is fully charged to the pressure normally carried in the system. When the pressure of fluid in chamber 405 is increased to about forty pounds the diaphragm 411 will be caused to deflect upwardly against the pressure of spring 415.

It will here be noted that when the pressure of fluid in chamber 405 causes the diaphragm 411 to deflect upwardly, the stem 416 will not move for the reason that the extension 426 engages the lower surface of the opening 417, thus maintaining the stem 416 against movement with the diaphragm.

Now when either a service or an emergency reduction in brake pipe pressure is effected, the pressure in chamber 402 of the charging valve device is correspondingly reduced. The check valve 431 at this time prevents back flow of fluid from the emergency reservoir and connected chamber 405 to the brake pipe.

When the pressure of fluid in chamber 402 has been reduced to a degree sufficient to permit the emergency reservoir pressure in chamber 405 to overcome friction of the diaphragm assembly, the diaphragm 401 will be caused to flex in a direction toward the right-hand. Deflection of the diaphragm in this direction causes the attached stem 420 and slide valve 421 to move in the same direction into a position in which the slide valve 421 covers passage 430 in the seat. With this passage covered by the slide valve further flow of fluid from chamber 420 and thereby the brake pipe to the emergency reservoir and connected chamber 405 is cut-off.

As the stem 420 is moved in a direction toward the right-hand, the extension 426 is moved in the same direction until it is moved out of the opening 417. With the extension 426 withdrawn from the opening 417 the combined pressure of spring 419 and the pressure of fluid at emergency reservoir pressure acting on the outer end of the stem 416 causes the stem 416 to move upwardly into engagement with the diaphragm 411 to a position in which the opening 417 is moved out of alignment with the end of the extension 426 and in which the end of the extension may engage the adjacent surface of the stem. With the stem 416 in this position the diaphragm assemblage including slide valve 421 will be locked in its cut-off position.

The stem 416 will be maintained in its upper or locking position so long as the pressure of fluid in chamber 405 and thereby the emergency reservoir is not reduced below the pressure of spring 415, say to below forty pounds.

From the foregoing description it will be understood that since emergency reservoir pressure never drops below forty pounds during normal service or emergency application, the charging valve device functions to open the auxiliary charging port only during initial charging of the equipment.

Having now described my invention, what I claim as new and desire to secure by Letters Patent, is:

1. In a fluid pressure brake equipment of the type comprising a brake pipe, an auxiliary reservoir, an emergency reservoir and a brake controlling valve device having a brake release position in which communication is established from the brake pipe to both of said reservoirs, in combination, another communication between the brake pipe and the emergency reservoir through which fluid under pressure may flow from the brake pipe to the emergency reservoir in initially charging the equipment, means operative to open or close said communication, said means including a movable abutment responsive to the pressure of fluid in a chamber and operative upon a reduction of pressure in the chamber to close said other communication.

2. In a fluid pressure brake equipment of the type comprising a brake pipe, an auxiliary reservoir, an emergency reservoir and a brake controlling valve device having a brake release position in which communication is established from the brake pipe to both of said reservoirs, in combination, another communication between the brake pipe and the emergency reservoir through which fluid under pressure may flow from the brake pipe to the emergency reservoir in initially charging the equipment, a slide valve operative to open or close said other communication, means for controlling said slide valve, said means including a movable abutment responsive to the pressure of fluid in a chamber initially charged with fluid at brake pipe pressure and operative upon a reduction of pressure in the chamber to effect operation of said slide valve to close said other communication.

3. In a fluid pressure brake equipment of the type comprising a brake pipe, an auxiliary reservoir, an emergency reservoir and a brake controlling valve device having a brake release position in which communication is established from the brake pipe to both of said reservoirs, in combination, a charging valve device for establishing another communication between the brake pipe and emergency reservoir through which fluid under pressure may flow from the brake pipe to the emergency reservoir in initially charging the equipment, said charging valve device comprising a chamber initially charged with fluid under pressure at brake pipe pressure another chamber adapted to be charged with fluid under pressure at emergency reservoir pressure and a movable abutment subject to the pressures of fluid in the first mentioned chamber and said other chamber and operative upon a reduction in pressure in said first mentioned chamber for closing said other communication.

4. In a fluid pressure brake equipment of the type comprising a brake pipe, an auxiliary reservoir, an emergency reservoir and a brake controlling valve device having a brake release position in which communication is established from the brake pipe to both of said reservoirs, in combination, a fluid conducting passage between the brake pipe and the emergency reservoir through which fluid under pressure may flow from the brake pipe to the emergency reservoir in initially charging the equipment, means operative to open or close said passage, other means for controlling the operation of said means, said other means including a movable abutment subject to the pressure of fluid in a first chamber initially charged with fluid at brake pipe pressure and a second chamber adapted to be charged with fluid at emergency reservoir pressure and operative upon a reduction in pressure in said first chamber to effect operation of said means to close said passage.

5. In a fluid pressure brake equipment of the type comprising a brake pipe, an auxiliary reservoir, an emergency reservoir and a brake controlling valve device having a brake release position in which communication is established from the brake pipe to both of said reservoirs, in combination, a fluid conducting passage between the brake pipe and the emergency reservoir through which fluid under pressure may flow from the brake pipe to the emergency reservoir in initially charging the equipment, means operative to open or close said passage, a diaphragm assemblage for controlling said means, said diaphragm assemblage being subject to the pressure of fluid in a first chamber initially charged with fluid at brake pipe pressure and a second chamber adapted to be charged with fluid at emergency reservoir pressure and operative upon a reduction in pressure in said first chamber to effect operation of said means to close said passage.

6. In a fluid pressure brake equipment of the type comprising a brake pipe, an auxiliary reservoir, an emergency reservoir and a brake controlling valve device having a brake release position in which communication is established from the brake pipe to both of said reservoirs, in combination, a fluid conducting passage between the brake pipe and the emergency reservoir through which fluid under pressure may flow from the brake pipe to the emergency reservoir in initially charging the equipment, means operative to open or close said passage, a chamber initially charged with fluid at brake pipe pressure, another chamber adapted to be charged with fluid at emergency reservoir pressure, a movable abutment subject to the pressure of fluid in the first mentioned chamber and said other chamber operative upon a reduction of pressure of fluid in the first mentioned chamber to effect operation of said means to close said passage.

7. In a fluid pressure brake equipment of the type comprising a brake pipe, an auxiliary reservoir, an emergency reservoir and a brake controlling valve device having a brake release position in which communication is established from the brake pipe to both of said reservoirs, in combination, another communication between the brake pipe and the emergency reservoir through which fluid under pressure may flow from the brake pipe to the emergency reservoir, a fluid pressure chamber adapted to be charged with fluid at brake pipe pressure, means responsive to the pressure of fluid in said chamber when the pressure of fluid in said emergency reservoir is below a predetermined degree to maintain said other communication open and being operative upon a reduction in the pressure of fluid in said chamber when the pressure of fluid in said emergency reservoir is above said predetermined degree to close said other communication and maintain said other communication closed so long as emergency reservoir pressure is above said predetermined degree.

8. In a fluid pressure brake equipment of the type comprising a brake pipe, an auxiliary reservoir, an emergency reservoir and a brake controlling valve device having a brake release position in which communication is established from the brake pipe to both of said reservoirs, in combination, another communication between the brake pipe and the emergency reservoir through which fluid under pressure may flow from the brake pipe to the emergency reservoir, means for opening or closing said other communication, a fluid pressure chamber adapted to be charged with fluid at brake pipe pressure, other means subject to the pressure of fluid in said chamber for controlling the first mentioned means, said other means being responsive to a decrease in the pressure of fluid in said chamber for effecting operation of said first mentioned means to close said other communication and to maintain said other communication closed so long as emergency reservoir pressure is not decreased below a predetermined degree irrespective of a subsequent increase in brake pipe pressure.

9. In a fluid pressure brake equipment of the type comprising a brake pipe, an auxiliary reservoir, an emergency reservoir and a brake controlling valve device having a brake release position in which communication is established from the brake pipe to both of said reservoirs, in combination, another communication between the brake pipe and the emergency reservoir through which fluid under pressure may flow from the brake pipe to the emergency reservoir, a first chamber adapted to be charged with fluid at brake pipe pressure, a second chamber adapted to be charged with fluid at emergency reservoir pressure, means including a movable abutment responsive to a reduction in pressure in said first chamber for closing said other communication and responsive to an increase in pressure in said first chamber to open said communication only upon a predetermined reduction in the pressure of fluid in said second chamber.

10. In a fluid pressure brake equipment of the type comprising a brake pipe, an auxiliary reservoir, an emergency reservoir and a brake controlling valve device having a brake release position in which communication is established from the brake pipe to both of said reservoirs, in combination, another communication between the brake pipe and the emergency reservoir through which fluid under pressure may flow from the brake pipe to the emergency reservoir, valve means for opening or closing said other communication, a first fluid pressure chamber adapted to be charged with fluid at brake pipe pressure, a second fluid pressure chamber adapted to be charged with fluid at emergency reservoir pressure, means for controlling said valve means, said means including a movable abutment responsive to a decrease in pressure in said first chamber for effecting operation of said valve means to close said other communication and maintain said other communication closed so long as the pressure of fluid in said second chamber is not decreased below some predetermined relatively low degree.

11. In a fluid pressure brake equipment of the type comprising a brake pipe, an auxiliary reservoir, an emergency reservoir and a brake controlling valve device having a release position for establishing communication between the brake pipe and both of said reservoirs, in combination, means for establishing another communication from the brake pipe to the emergency reservoir for accelerating the charging rate of said reservoir comprising a movable abutment subject to the opposing pressures of the brake pipe and emergency reservoir, said movable abutment having a first position for opening said other communication and a second position for closing said other communication and being movable to said second position in response to a reduction in brake pipe pressure.

12. In a fluid pressure brake equipment of the type comprising a brake pipe, an auxiliary reservoir, an emergency reservoir and a brake controlling valve device having a release position for establishing communication between the brake pipe and both of said reservoirs, in combination, means for establishing another communication from the brake pipe to the emergency reservoir for accelerating the charging rate of said reservoir comprising a movable abutment subject to the opposing pressures of the brake pipe and emergency reservoir, said movable abutment having a first position for opening said other communication and a second position for closing said other communication and being movable to said second position in response to a reduction in brake pipe pressure, and means interposed in said other communication for preventing back flow of fluid from said emergency reservoir to the brake pipe.

13. In a fluid pressure brake equipment of the type comprising a brake pipe, an auxiliary reservoir, an emergency reservoir and a brake controlling valve device having a release position for establishing communication between the brake pipe and both of said reservoirs, in combination, means for establishing another communication from the brake pipe to the emergency reservoir for accelerating the charging rate of said reservoir comprising a movable abutment subject to the opposing pressures of the brake pipe and emergency reservoir, said movable abutment having a first position for opening said other communication and a second position for closing said other communication and being movable to said second position in response to a reduction in brake pipe pressure, and means automatically operative to maintain said movable abutment in said second position so long as emergency reservoir pressure is not reduced below some chosen degree.

14. In a fluid pressure brake equipment of the type comprising a brake pipe, an auxiliary reservoir, an emergency reservoir and a brake controlling valve device having a release position for establishing communication between the brake pipe and both of said reservoirs, in combination, another communication between the brake pipe and the emergency reservoir through which fluid under pressure may flow from the brake pipe to the emergency reservoir, valve means operative to open or close said other communication, means subject to the pressure of fluid in said brake pipe and the pressure of fluid in such emergency reservoir for controlling said valve means, said means being responsive to a reduction in brake pipe pressure to effect operation of said valve means to close and maintain closed said other communication so long as the emergency reservoir pressure is maintained above some predetermined relatively low degree.

15. In a fluid pressure brake equipment of the type comprising a brake pipe, an auxiliary reservoir, an emergency reservoir and a brake controlling valve device having a release position for establishing communication between the brake pipe and both of said reservoirs, in combination, another communication between the brake pipe and the emergency reservoir through which fluid under pressure may flow from the brake pipe to the emergency reservoir, valve means operative to open or close said other communication, a flexible diaphragm for controlling the operation of said valve means, said flexible diaphragm being subject on one side to brake pipe pressure and on the other side to emergency reservoir pressure and having a normal position for maintaining said valve means in a position to open said other communication and being operative upon a reduction in brake pipe pressure for effecting movement of said valve means to a position to close and maintain closed said other communication so long as emergency reservoir pressure is not reduced below some predetermined degree irrespective of a subsequent increase in brake pipe pressure.

16. In a fluid pressure brake equipment of the type comprising a brake pipe, an auxiliary reservoir, an emergency reservoir and a brake controlling valve device having a release position for establishing communication between the brake pipe and both of said reservoirs, in combination, another communication between the brake pipe and the emergency reservoir through which fluid under pressure may flow from the brake pipe to the emergency reservoir, valve means operative to open or close said other communication, a movable abutment subject to the opposing pressure of brake pipe and the emergency reservoir for controlling said valve means, said movable abutment having a normal position for maintaining said valve means in a position to open said other communication when initially charging said reservoirs with fluid under pressure from the brake pipe and being operative to another position to effect movement of said valve means to close said other communication upon a reduction in brake pipe pressure and a subsequent increase in brake pipe pressure for recharging said reservoirs so long as the pressure of fluid in said emergency reservoir is above a predetermined degree.

17. In a fluid pressure brake equipment of the type comprising a brake pipe, an auxiliary reservoir, an emergency reservoir and a brake controlling valve device having a release position for establishing communication between the brake pipe and both of said reservoirs, in combination, another communication between the brake pipe and the emergency reservoir through which fluid under pressure may flow from the brake pipe to the emergency reservoir, valve means operative to open or close said other communication, a movable abutment subject to the opposing pressure of brake pipe and emergency reservoir for controlling said valve means, said movable abutment having a normal position for maintaining said valve means in a position to open said other communication when initially charging said reservoirs with fluid under pressure from the brake pipe and being operative to another position to effect movement of said valve means to close said other communication upon a reduction in brake pipe pressure, and means for maintaining said movable abutment in said other position upon a subsequent increase in brake pipe pressure to recharge said reservoir.

18. In a fluid pressure brake equipment of the type comprising a brake pipe, an auxiliary reservoir, an emergency reservoir and a brake controlling valve device having a release position for establishing communication between the brake pipe and both of said reservoirs, in combination, another communication between the brake pipe and the emergency reservoir through which fluid under pressure may flow from the brake pipe to the emergency reservoir, valve means operative to open or close said other communication, a movable abutment subject to the opposing pressure of brake pipe and emergency reservoir for controlling said valve means, said movable abutment having a normal position for maintaining said valve means in a position to open said other communication when initially charging said reservoirs with fluid under pressure from the brake pipe and being operative to another position to effect movement of said valve means to close said other communication upon a reduction in brake pipe pressure, a check valve interposed in said other passage for preventing back flow of fluid under pressure from said emergency reservoir to said brake pipe upon initiating a reduction in brake pipe pressure, and means associated with said movable abutment when the emergency reservoir pressure is maintained above a predetermined degree for maintaining said movable abutment in said other position upon a subsequent increase in brake pipe pressure.

19. In a fluid pressure brake equipment of the type comprising a brake pipe, an auxiliary reservoir, an emergency reservoir and a brake controlling valve device having a release position for establishing communication between the brake pipe and both of said reservoirs, in combination, another communication between the brake pipe and the emergency reservoir through which fluid under pressure may flow from the brake pipe to the emergency reservoir, valve means operative to open or close said other communication, a movable abutment subject to the opposing pressure of brake pipe and emergency reservoir for controlling said valve means, said movable abutment having a normal position for maintaining said valve means in a position to open said other communication when initially charging said reservoirs with fluid under pressure from the brake pipe and being operative to another position to effect movement of said valve means to close said other communication upon a reduction in brake pipe pressure, and locking means for locking said movable abutment in said other position against movement to said normal position upon a subsequent increase in brake pipe pressure.

20. In a fluid pressure brake equipment of the type comprising a brake pipe, an auxiliary reservoir, an emergency reservoir and a brake controlling valve device having a release position for establishing communication between the brake pipe and both of said reservoirs, in combination, another communication between the brake pipe and the emergency reservoir through which fluid under pressure may flow from the brake pipe to the emergency reservoir, valve means operative to open or close said other communication, a movable abutment subject to the opposing pressure of brake pipe and emergency reservoir for controlling said valve means, said movable abutment having normal position for maintaining said valve means in a position to open said other communication when initially charging said reservoirs with fluid under pressure from the brake pipe and being operative to another position to effect movement of said valve means to close said other communication upon a reduction in brake pipe pressure, and fluid pressure operated locking means for locking said movable abutment in said other position against movement to said normal position upon a subsequent increase in brake pipe pressure.

21. In a fluid pressure brake equipment of the type comprising a brake pipe, an auxiliary reservoir, an emergency reservoir and a brake controlling valve device having a release position for establishing communication between the brake pipe and both of said reservoirs, in combination, another communication between the brake pipe and the emergency reservoir through which fluid under pressure may flow from the brake pipe to the emergency reservoir, valve means operative to open or close said other communication, a movable abutment subject to the opposing pressure of brake pipe and emergency reservoir for controlling said valve means, said movable abutment having a normal position for maintaining said valve means in a position to open said other communication when initially charging said reservoirs with fluid under pressure from the brake pipe and being operative to another position to effect movement of said valve means to close said other communication upon a reduction in brake pipe pressure, and locking means for locking said movable abutment in said other position, said locking means comprising spring means operative upon movement of said movable abutment to said other position against movement to said normal position upon a subsequent increase in brake pipe pressure.

22. In a fluid pressure brake equipment of the type comprising a brake pipe, an auxiliary reservoir, an emergency reservoir and a brake controlling valve device having a release position in which communication is established from the brake pipe to both of said reservoirs, in combination, means for establishing another communication between the brake pipe and emergency reservoir through which fluid under pressure may flow from the brake pipe to the emergency reservoir in initially charging the equipment and being operative upon a reduction in brake pipe pressure to close said other communication, and other means for preventing operation of said means to open said other communication upon a subsequent increase in brake pipe pressure.

23. In a fluid pressure brake equipment of the type comprising a brake pipe, an auxiliary reservoir, an emergency reservoir and a brake controlling valve device having a release position in which communication is established from the brake pipe to both of said reservoirs, in combination, means for establishing another communication between the brake pipe and emergency reservoir through which fluid under pressure may flow from the brake pipe to the emergency reservoir in initially charging the equipment and being operative upon a reduction in brake pipe pressure to close said other communication, and other means operative only upon a predetermined reduction in emergency reservoir pressure for permitting said means to open said other communication upon subsequent increase in brake pipe pressure.

24. In a fluid pressure brake equipment of the type comprising a brake pipe which may be charged with fluid under pressure and a brake controlling valve device having a release position in which communication is established from the brake pipe to both of said reservoirs, in combination, means responsive to an increase in brake pipe pressure in initially charging the equipment for establishing another communication between the brake pipe and said emergency reservoir, said means being responsive to emergency reservoir pressure when emergency reservoir pressure is increased to slightly below that normally carried for closing the last mentioned communication.

25. In a fluid pressure brake equipment of the type comprising a brake pipe which may be charged with fluid under pressure and a brake controlling valve device having a release position in which communication is established from the brake pipe to both of said reservoirs, in combination, valve means for establishing another communication between the brake pipe and said emergency reservoir, and means responsive to an increase in brake pipe pressure in initially charging the equipment for operating said valve means to open the last mentioned communication and responsive to emergency reservoir pressure and a spring when emergency reservoir pressure is increased to slightly below that normally carried for closing the last mentioned communication.

26. In a fluid pressure brake equipment of the type comprising a brake pipe which may be charged with fluid under pressure and a brake controlling valve device having a release position in which communication is established from the brake pipe to both of said reservoirs, in combination, means responsive to an increase in brake pipe pressure in initially charging the equipment for establishing another communication between the brake pipe and said emergency reservoir, said means being responsive to emergency reservoir pressure when emergency reservoir pressure is increased to slightly below that normally carried for closing the last mentioned communication, and other means operative only upon a predetermined reduction in emergency reservoir pressure for permitting said means to open the last mentioned communication upon a subsequent increase in brake pipe pressure.

27. In a fluid pressure brake equipment of the type comprising a brake pipe which may be charged with fluid under pressure and a brake controlling valve device having a release position in which communication is established from the brake pipe to both of said reservoirs, in combination, means responsive to an increase in brake pipe pressure in initially charging the equipment for establishing another communication between the brake pipe and said emergency reservoir, said means being responsive to emergency reservoir pressure when emergency reservoir pressure is increased to slightly below that normally carried for closing the last mentioned communication, and valve means subject to emergency reservoir pressure being operative only in response to a predetermined reduction in emergency reservoir pressure to permit said means to open the last mentioned communication upon a subsequent increase in brake pipe pressure.

28. In a fluid pressure brake equipment of the type comprising a brake pipe which may be charged with fluid under pressure and a brake controlling valve device having a release position in which communication is established from the brake pipe to both of said reservoirs, in combination, means responsive to an increase in brake pipe pressure in initially charging the equipment for establishing another communication between the brake pipe and said emergency reservoir, said means being responsive to emergency reservoir pressure when emergency reservoir pressure is increased to slightly below that normally carried for closing the last mentioned communication, and a movable abutment subject to the opposing pressures of emergency reservoir and a spring for conditioning said means for operation upon a subsequent increase in brake pipe pressure, said movable abutment being operative only upon a predetermined reduction in emergency reservoir pressure.

29. In a fluid pressure brake equipment of the type comprising a brake pipe which may be charged with fluid under pressure and a brake controlling valve device having a release position in which communication is established from the brake pipe to both of said reservoirs, in combination, valve means for establishing another communication between the brake pipe and said emergency reservoir, a first chamber adapted to be charged with fluid at brake pipe pressure, a second chamber adapted to be charged with fluid at emergency reservoir pressure, means responsive to a reduction in pressure in said first chamber for effecting operation of said valve means to close the other communication, and other means responsive to a predetermined increase in pressure in said second chamber for conditioning said means against operation for effecting operation of said valve means to open the other communication upon a subsequent increase in brake pipe pressure.

30. In a fluid pressure brake equipment of the type comprising a brake pipe which may be charged with fluid under pressure and a brake controlling valve device having a release position in which communication is established from the brake pipe to both of said reservoirs, in combination, valve means for establishing another communication between the brake pipe and said emergency reservoir, a first chamber adapted to be charged with fluid at brake pipe pressure, a second chamber adapted to be charged with fluid at emergency reservoir pressure, means responsive to a reduction in pressure in said first chamber for effecting operation of said valve means to close the other communication, and a movable abutment subject to the opposing pressures of fluid in said second chamber and a spring and being responsive to a predetermined increase in pressure in said second chamber for conditioning said means against operation for effecting operation of said valve means to open the other communication upon a subsequent increase in brake pipe pressure.

31. In a fluid pressure brake equipment of the type comprising a brake pipe, an emergency reservoir, an auxiliary reservoir and a brake cylinder, in combination, a brake controlling valve device operative upon an increase in brake pipe pressure in initially charging the equipment with fluid under pressure to a release position in which communication is established from the brake pipe to both of said reservoirs and from the brake cylinder to the atmosphere and operative upon a decrease in brake pipe pressure at a service rate to a service position in which communication is established from said auxiliary reservoir to the brake cylinder to effect a service application of the brakes and operative upon a decrease in brake pipe pressure at an emergency rate to an emergency position in which communication is established from both of said reservoirs to the brake cylinder to effect an emergency application of the brakes, means for establishing another communication between the brake pipe and emergency reservoir through which fluid under pressure may flow from the brake pipe to the emergency reservoir in initially charging the equipment, said means being operative in response to a decrease in brake pipe pressure at either a service or an emergency rate to close said other communication, and other means for conditioning said means against operation to open the other communication upon a subsequent increase in brake pipe pressure following either a service or emergency rate of reduction in brake pipe pressure.

32. In a fluid pressure brake equipment of the type comprising a brake pipe, an emergency reservoir, an auxiliary reservoir and a brake cylinder, in combination, a brake controlling valve device operative upon an increase in brake pipe pressure in initially charging the equipment with fluid under pressure to a release position in which communication is established from the brake pipe to both of said reservoirs and from the brake cylinder to the atmosphere and operative upon a decrease in brake pipe pressure at a service rate to a service position in which communication is established from said auxiliary reservoir to the brake cylinder to effect a service application of the brakes and operative upon a decrease in brake pipe pressure at an emergency rate to an emergency position in which communication is established from both of said reservoirs to the brake cylinder to effect an emergency application of the brakes, means for establishing another communication between the brake pipe and emergency reservoir through which fluid under pressure may flow from the brake pipe to the emergency reservoir in initially charging the equipment, said means being operative in response to a decrease in brake pipe pressure at either a service or an emergency rate to close said other communication, and other means operative only upon a drop in emergency reservoir pressure below that normally made in effecting either a service or an emergency application of the brakes to condition said means for operation to open said other passage upon a subsequent increase in brake pipe pressure.

33. The combination with a fluid pressure brake equipment of the type comprising a brake pipe, an auxiliary reservoir, an emergency reservoir and a brake controlling valve device having a brake releasing position in which a communication is established between the brake pipe and both of said reservoirs, of an additional communication between the brake pipe and the emergency reservoir, means closing said additional communication when the brake pipe is depleted of fluid under pressure and operative upon a slight increase in brake pipe pressure in initially charging the equipment for admitting fluid under pressure from the brake pipe to said emergency reservoir and operative upon an increase in emergency reservoir pressure to a chosen degree to cut off the flow of fluid from the brake pipe through said additional communication.

34. The combination with a fluid pressure brake equipment of the type comprising a brake pipe, an auxiliary reservoir, an emergency reservoir and a brake controlling valve device having a brake releasing position in which a communication is established between the brake pipe and both of said reservoirs, of an additional communication between the brake pipe and the emergency reservoir, means closing said additional communication when the brake pipe is depleted of fluid under pressure and operative upon a slight increase in brake pipe pressure in initially charging the equipment for admitting fluid under pressure from the brake pipe to said emergency reservoir and operative upon an increase in emergency reservoir pressure to a chosen degree to cut off the flow of fluid from the brake pipe through said additional communication, said means being operative upon a subsequent reduction in emergency reservoir pressure to below said chosen pressure for admitting fluid under pressure from the brake pipe to the emergency reservoir.

ROBERT M. OLIVER.